Feb. 24, 1931.  S. B. HARKER  1,793,798
DISHWASHING MACHINE
Filed July 5, 1928    3 Sheets-Sheet 1

INVENTOR
SARAH B. HARKER.

By
Frank S. Greene
ATTORNEY

Feb. 24, 1931.   S. B. HARKER   1,793,798
DISHWASHING MACHINE
Filed July 5, 1928   3 Sheets-Sheet 2
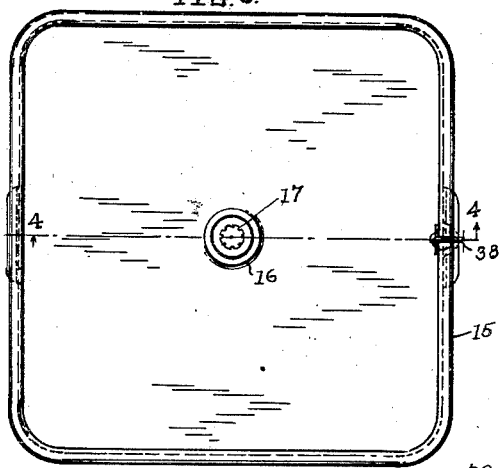
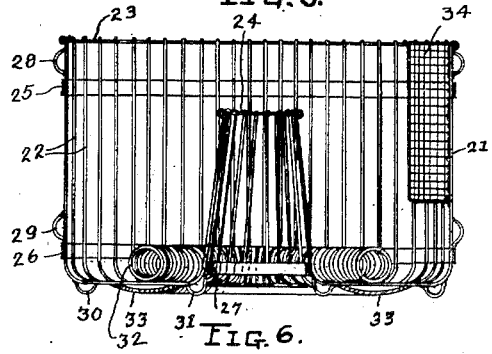
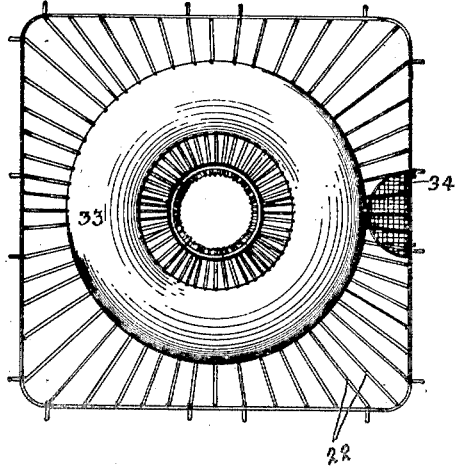
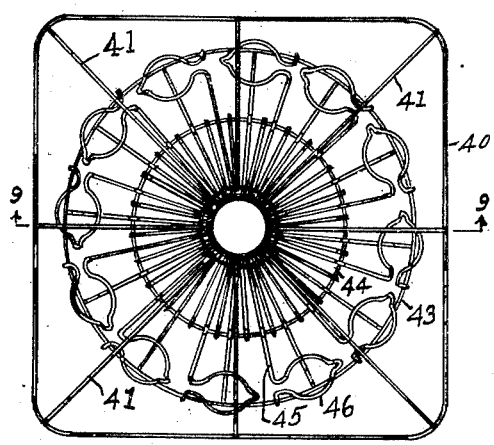
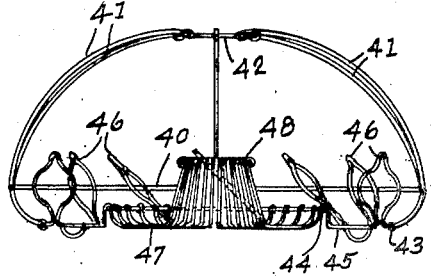
INVENTOR
SARAH B. HARKER.
BY
By Frank S. Greene
ATTORNEY Feb. 24, 1931.  S. B. HARKER  1,793,798
DISHWASHING MACHINE
Filed July 5, 1928   3 Sheets-Sheet 3

INVENTOR
SARAH B. HARKER.

By Frank S. Greene
ATTORNEY

Patented Feb. 24, 1931

1,793,798

UNITED STATES PATENT OFFICE

SARAH B. HARKER, OF ROCKY RIVER, OHIO

DISHWASHING MACHINE

Application filed July 5, 1928. Serial No. 290,323.

This invention relates to dish washing machines and has for its object to provide an efficient dish washing machine for household use which is of simple and rugged construction and which can be manufactured at a relatively low cost.

A further object of the invention is to provide a dish washing machine which requires a relatively small quantity of hot water for the washing operation.

A further object is to provide a dish washing machine in which the dishes to be washed are supported in an oscillatory receptacle containing the cleansing liquid.

A further object is to provide an oscillatory receptacle for the dishes and cleansing liquid which is non-circular in form and preferably of substantially rectangular form so as to cause an effective surging movement of the liquid within the receptacle upon oscillation thereof.

A further object is to provide an outer casing or tub enclosing the oscillating receptacle so as to catch any liquid dripping from the receptacle during its operation and to provide a protective casing for the oscillating receptacle which will prevent anyone from being injured by contact with the moving parts of the machine.

A further object is to provide a removable dish rack in the form of a basket shaped to fit in the receptacle and so constructed that the dishes may be stacked therein prior to the insertion of the basket into the receptacle, the dishes being securely held in place in the basket during the washing operation and being removable therewith after the washing operation is completed.

A further object is to provide means by which the cleansing liquid may be drained from the receptacle while the receptacle is being oscillated so as to prevent sediment being deposited on the dishes in the receptacle.

A further object is to provide a dish holding rack or basket of such form that dishes of various sizes and shapes can be conveniently stacked therein.

A further object is to provide a dish washing device in the form of a receptacle for dishes and cleansing liquid which is adapted to be removably mounted upon a vertically disposed oscillatory shaft of a clothes washing machine of the oscillating propeller type, the dish washing receptacle being so constructed that it is adapted to be mounted on the oscillatory shaft which carries the propeller for causing surging movements of the water and clothing in the tub.

With the above and other objects in view, the invention may be said to comprise the dish washing machine as illustrated in the accompanying drawings hereinafter described and particularly set forth in the appended claims, together with such variations and modifications thereof as will be apparent to one skilled in the art to which the invention appertains.

Reference should be had to the accompanying drawings forming a part of this specification in which:

Fig. 3 is a top plan view of the dish washing receptacle.

Fig. 4 is a central vertical section through the receptacle taken on the line indicated at 4—4 in Fig. 3.

Fig. 5 is a central vertical section through the dish holding basket.

Fig. 6 is a bottom plan view of the basket shown in Fig. 5.

Fig. 8 is a bottom plan view of the basket shown in Fig. 7.

Fig. 9 is a section taken on the line indicated at 9—9 in Fig. 8.

Figure 1:
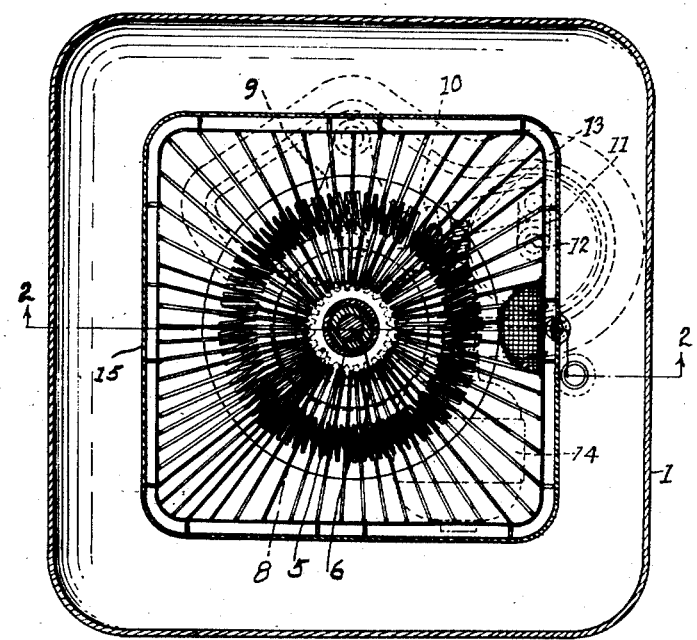
Figure 1 is a horizontal section through the machine taken on the line indicated at 1—1 in Fig. 2.
Figure 2:
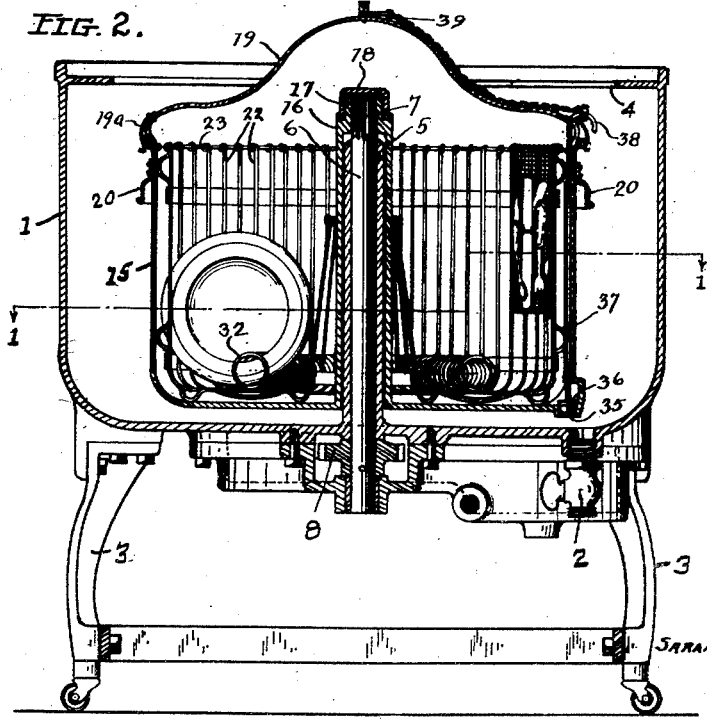
Fig. 2 is a central vertical section through the machine taken on the line indicated at 2—2 in Fig. 1.

Referring to the accompanying drawings, the machine as herein illustrated is provided with an outer casing 1 preferably in the form of a tub provided with a drain cock 2 by means of which liquid may be drained there-from when desired. The tub 1 may be supported in any desired manner depending on whether it is to be fixed or portable. As herein shown, the machine is portable, being supported upon suitable supporting legs 3, provided with castors so that the machine may be readily moved along the floor. The tub 1 is provided with an opening 4 at the top through which access may be had to the interior thereof. At the center of the tub, there is an integral vertical sleeve 5, which extends upwardly from the bottom to adjacent the top of the tub. Within the sleeve 5, there is rotatably mounted a vertical shaft 6 which has a splined upper end 7 projecting above the upper end of the sleeve 5. Beneath the tub, the shaft 6 has fixed thereto a gear 8 which meshes with a gear segment 9 which may be oscillated by means of a connecting rod 10 connected at one end to the segment and at the other to an arm 11 fixed to a shaft 12 which is driven through worm gearing 13 by an electric motor 14.

Removably mounted on the shaft 6 within the tub 1, there is a receptacle 15 which forms a container for the dishes to be washed and the cleansing liquid. This receptacle is preferably of rectangular form and of a size to pass through the opening in the top of the tub, being sufficiently smaller than the tub to permit of its being oscillated within the tub. The receptacle 15 is formed with a sleeve 16, which is formed integrally therewith and extends upwardly from the bottom at the center thereof. This sleeve is of an internal diameter such that it substantially fits over the integral sleeve 5 of the tub and has an upper end portion 17 which is of reduced internal diameter and which is splined to fit upon the upper splined end 7 of the shaft 6. The receptacle 15 is thus supported by the shaft with its bottom clear of the bottom of the tub 1 and with its upper edge slightly below the upper end of the sleeve 16, so that when the shaft is oscillated, the receptacle will be oscillated with it. The upper end of the sleeve 16 is externally threaded to receive a screw cap 18 which serves to close the upper end of the sleeve and prevent water from coming into contact with the operating shaft.

The receptacle is preferably provided with a cover 19 which may be opened to permit access to the interior of the receptacle and which is closed while the receptacle is being oscillated. The cover 19 is preferably of pyramidal form so that the movement of any water thrown against the cover will be impeded when the direction of movement of the receptacle is reversed and marginal portions 19a of the cover may be flattened sufficiently to clear the top of the tub as the receptacle is oscillated. The receptacle 15 is adapted to be lowered vertically through the opening in the top of the tub onto the shaft 6 and to be removed from the tub by lifting through the opening, the receptacle being provided with suitable handles 20 by which it may be lifted from the tub or lowered into the tub.

When the receptacle is oscillated, the liquid contained therein is caused to surge back and forth in the receptacle and in order to support the dishes and hold them in position so that they will be acted upon by the surging liquid, any suitable means may be provided within the receptacle for securely holding the dishes to be washed.

As herein shown, the dish holding rack is in the form of a wire basket 21 which is of a shape corresponding to the shape of the receptacle and of a size to fit within the receptacle so that the basket is rigidly held against relative movement with respect to the receptacle during the operation of the machine.

The basket 21 may be formed of wires 22 which are attached at one end to a bead wire 23 extending around the top of the basket and extend vertically down from the wire 23, radially across the bottom and upwardly to a wire ring 24 which is of a size to fit over the central sleeve 16 of the receptacle. The vertical portions of the wire are spaced apart sufficiently to receive the edges of the plates or other dishes between them and are reinforced by a hoop 25 extending around the basket a short distance from the top thereof and the hoop 26 extending around the basket a short distance from the bottom thereof. The upwardly extending inner end portions of the wires 22 are inclined from the bottom of the basket to the ring 24, forming a reentrant tapered portion at the center of the basket which is adapted to slip over the central sleeve, the lower part of the reentrant portion being reinforced by a band 27. The wire basket is somewhat smaller than the receptacle and certain of the wires 22 adjacent the top of the basket are bowed outwardly to provide projections 28 which engage with the walls of the receptacle when the basket is lowered in the receptacle. Some of the wires 22 are also bowed outwardly at the side of the basket adjacent the bottom and also on the bottom of the basket to provide projections 29, 30 and 31 which engage with the side walls and bottom of the receptacle when the basket is in place therein, the projections 28, 29, 30 and 31 serving to space the walls and bottom of the basket from the side walls and bottom of the receptacle.

It is desirable that plates and other dishes be supported in upright position within the basket and to assist in holding the dishes in such position, a coil spring 32 is bent to circular form and attached to the bottom of the basket around the central re-entrant portion thereof. The coils of the spring provide spring clips for engagement with the edges of plates and other dishes to hold them in upright position in the basket. The vertically disposed wires 22 at the outer side of the basket and around the central sleeve are adapted to receive the edges of plates and other dishes between them to assist in holding the dishes in upright position. The dishes are preferably stacked in the basket before the basket is inserted into the receptacle and in order to catch liquid which may drip from the dishes, an annular trough 33 is attached to the bottom of the basket immediately beneath the coil spring 32, the trough being so positioned that it will catch the major portion of any liquid which may drain off the dishes while they are being stacked and carried to or from the washing machine.

The rectangular shape of the basket is advantageous since it provides spaces of varying widths for dishes of different sizes, wider spaces being provided between the central re-entrant portion of the basket and the outer corners thereof. These wide spaces are adapted to receive larger dishes such as platters and the space at the corners may also be utilized for stacking cups, bowls and the like.

It is desirable to keep the silverware separate from the other dishes during the washing operation and in order to permit washing of the silverware simultaneously with the dishes, a wire mesh receptacle 34 for silverware is detachably secured to one of the walls of the basket.

In order to obtain effective washing action, it is desirable that plates and similar dishes be held in positions at an angle with respect to radial planes so that the liquid currents will sweep across the faces thereof when the receptacle is oscillated and it should be noted that the coils of the spring are disposed angularly with respect to radial planes so that plates and similar dishes placed between the coils will be supported at an angle such that the water will sweep across the faces thereof when the machine is in operation.

In order to prevent sediment from being deposited on the dishes, it is quite important that the water be drained from the receptacle while the receptacle is in motion and for this reason, the receptacle is provided with a drain outlet 35 which will permit the liquid to be drained from the receptacle into the tub while the receptacle is being oscillated. This drain outlet is located in the bottom of the receptacle adjacent a side wall thereof and is normally closed by means of a plug 36 which is attached to the lower end of a vertical rod 37 which is slidably mounted in the side wall of the receptacle and provided at its upper end with a handle 38 by means of which the rod and plug may be lifted to open the drain. The rod 37 and its guide are preferably so formed that the plug will be frictionally held in raised position after it has been lifted so that the drain opening will remain open while the receptacle is being oscillated. In order to facilitate the opening of the drain outlet when the machine is in operation, a chain or cord 39 may be detachably secured to the cover 20 adjacent the center thereof and to the handle 38 so that by grasping the cord or chain and exerting an upward pull, the plug 36 may be lifted to open the outlet.

Figure 7:
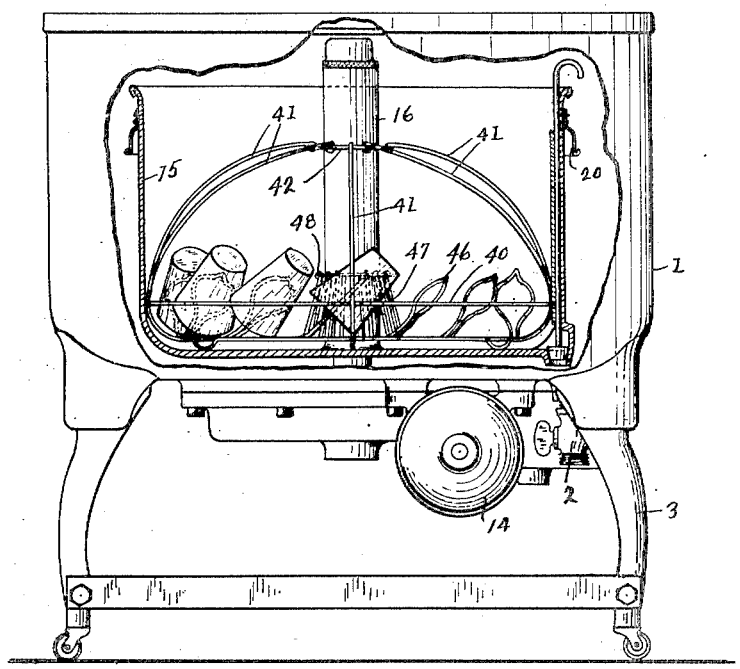
Fig. 7 is a side elevation of the machine broken away to show the receptacle in section with a modified form of dish rack or basket in the receptacle.
Figure 10:
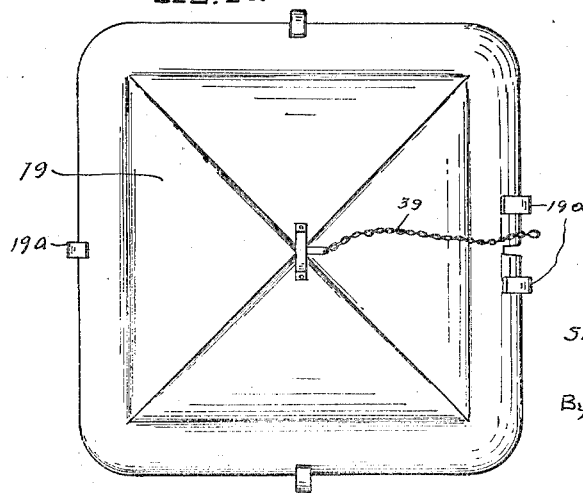
Fig. 10 is a plan view of the cover for the receptacle.

It is often desirable to wash the glassware separately from other dishes and in Figs. 7, 8 and 9 of the drawings, there is shown a rack or basket suitable for holding tumblers or other pieces of glassware during the washing operation. This rack has a substantially square outer frame 40 which is of a size to fit within the receptacle 15 and extending inwardly from this frame, there are radially disposed wires 41 which at their upper ends are connected to a wire ring 42 which is adapted to encircle the sleeve 16 at the center of the receptacle, and at their lower ends, the wires 41 extend downwardly and inwardly to a wire ring 43. Within the ring 43, there is a smaller wire ring 44 and connecting the rings 43 and 44, there are radially disposed wires 45, some of which are looped to provide upwardly and laterally extending clips 46 which provide supports for glass tumblers or the like. Within the ring 44, there is an inner guard portion formed by radially disposed wires 47 which extend inwardly and upwardly to a wire ring 48 which is disposed immediately beneath the ring 42, and which is of substantially the same size as the ring 42 so that it may be slipped over the central ring 16 of the receptacle.

In the operation of the device, the dishes to be washed are stacked in a receiving rack or basket and carried to the machine, the basket being lowered into the receptacle, the upper edge portion of which may be flared slightly to facilitate the insertion of the basket. Either before or after the insertion of the basket, a suitable quantity of cleansing liquid such as hot soapy water is placed in the receptacle and after the rack is lowered into the receptacle, the receptacle is then closed by the cover 19 and the oscillation of the receptacle is started.

After the receptacle has been oscillated for a sufficient time to thoroughly cleanse the dishes, the plug 36 is lifted and the liquid within the receptacle is allowed to slowly drain into the tub while the receptacle continues to oscillate, the drain cock of the tub being preferably open to permit the liquid to escape. The dishes may then be thoroughly rinsed by oscillating the receptacle for a short time with clean hot water therein, whereupon the basket may be lifted from the receptacle and left with the dishes therein to permit the dishes to drain and dry.

The tub 1 is preferably of the size and shape of the wash tub of a clothes washing machine of the oscillating propeller type and the shaft 6 is preferably adapted to receive the propeller of such a washing machine, as well as the dish washing receptacle, so that when the dish washing receptacle is removed from the tub, the propeller may be placed upon the shaft 6 so that clothes may be washed in the tub 1.

It will be apparent that a relatively small quantity of cleansing liquid will be required to fill the receptacle 15 and that very little hot water and soap is required for the washing operation. The rectangular form of the receptacle insures a strong surging action of the water within the receptacle, upon oscillation of the receptacle, so that an effective washing action is obtained. In addition, the rectangular form of the receptacle provides a rigid support for the dish rack or basket fitting within the receptacle so that there is no danger of movement of the basket with respect to the receptacle during the washing operation.

Furthermore, the utilization of the same motor and power transmission mechanism and the same tub for washing both clothes and dishes is a highly economical combination making possible the provision of a machine to wash both dishes and clothes at a cost but slightly exceeding the cost of an ordinary clothes washing machine.

What I claim is:

1. A dish washing machine comprising a receptacle for cleansing liquid of substantially rectangular form, means for supporting said receptacle and oscillating the same about a substantially central vertical axis, and a dish rack within the receptacle.

2. A dish-washing machine comprising a tub having an opening in the top thereof, a vertical shaft extending through the bottom of the tube centrally thereof, means for oscillating said shaft, and a substantially square receptacle for cleansing liquid removably mounted on the shaft and having a dish rack therein and a central sleeve keyed to the shaft, said receptacle being removable through the opening at the top of the tub.

3. A dish-washing machine comprising an oscillatory receptacle for cleansing liquid having side walls with portions angularly disposed to cause surging of the liquid, said receptacle having a tubular sleeve extending upwardly from the bottom thereof adjacent the center, a vertical receptacle supporting shaft extending upwardly into said sleeve and keyed thereto, means for supporting and oscillating said shaft, and a dish rack comprising a wire basket formed to fit within said receptacle, said basket having a bottom which has a re-entrant central portion provided with an opening to receive said sleeve.

4. A dish-washing machine comprising an oscillatory receptacle for cleansing liquid having side walls with portions angularly disposed to cause surging of the liquid, said receptacle having a tubular sleeve extending upwardly from the bottom thereof adjacent the center, a vertical receptacle supporting shaft extending upwardly into said sleeve and keyed thereto, means for supporting and oscillating said shaft, and a dish rack comprising a wire basket of a form to fit within said receptacle, said basket having a bottom which has a re-entrant central portion provided with an opening to receive said sleeve, said basket being smaller than the receptacle and having projections on the side walls and bottom thereof for engagement with the side walls and bottom of the receptacle to position the basket in the receptacle with the side walls and bottom thereof spaced inwardly from the walls and bottom of the receptacle.

5. A dish-washing machine comprising an oscillatory receptacle for cleansing liquid having side walls with portions angularly disposed to cause surging of the liquid, said receptacle having a tubular sleeve extending upwardly from the bottom thereof adjacent the center, a vertical receptacle supporting shaft extending upwardly into said sleeve and keyed thereto, means for supporting and oscillating said shaft and a dish rack comprising a wire basket of a form to fit within said receptacle, said basket having a bottom which has a re-entrant central portion provided with an opening to receive said sleeve, said basket being smaller than the receptacle and having projections on the side walls thereof adjacent the top and bottom for engagement with the side walls of the receptacle to position the basket in the receptacle with the side walls thereof spaced inwardly from the walls of the receptacle, the side walls of said basket being composed of vertical wires spaced to receive the edges of dishes stacked in the basket between them.

6. A dish-washing machine comprising a receptacle for cleansing liquid, said receptacle having a tubular sleeve extending upwardly from the bottom thereof adjacent the center, a vertical receptacle supporting shaft extending upwardly into said sleeve and keyed thereto, means for supporting and intermittently imparting rotative movements to said shaft, and a dish rack comprising a wire basket within said receptacle, said basket having a bottom which has a re-entrant central portion provided with an opening to receive said sleeve, said basket having dish holding means therein.

7. A dish-washing machine comprising a substantially rectangular receptacle for cleansing liquid, said receptacle having a tubular sleeve extending upwardly from the bottom thereof adjacent the center, a vertical receptacle supporting shaft extending upwardly into said sleeve and keyed thereto, means for supporting and oscillating said shaft and a dish rack comprising a wire basket of rectangular form within said receptacle, said basket having a bottom which has a re-entrant central portion provided with an opening to receive said sleeve, said basket having laterally spaced wires extending vertically down the sides thereof radially across the bottom and upwardly to form the re-entrant central portion and reinforcing bands to which the wires are attached around the basket adjacent the top and bottom thereof and around the re-entrant portion adjacent the top and bottom thereof, certain of said wires having outwardly bent projecting portions at the side and bottom of the basket to space the basket from the sides and bottom of the receptacle.

8. A dish-washing machine comprising a vertically disposed shaft, means for supporting and oscillating said shaft, and a substantially rectangular receptacle for cleansing liquid secured to the shaft and having means therein for supporting dishes to be washed, said receptacle having a cover of substantially pyramidal form.

9. A dish washing machine comprising a stationary tub having a drain outlet, a receptacle for cleansing liquid within said tub having means therein for supporting dishes to be washed, said receptacle having a drain outlet in its bottom adjacent the periphery thereof, a vertical shaft supported on the tub to which said receptacle is keyed, a motor operated mechanism for actuating said shaft, a valve for opening and closing said receptacle outlet, and means extending to the top of the receptacle and operable during actuation of the receptacle for actuating the valve to open said drain outlet of the receptacle.

10. A dish washing machine comprising a receptacle for cleansing liquid having means therein for supporting dishes to be washed, said receptacle having a drain outlet in its bottom adjacent the periphery thereof, means for supporting said receptacle and oscillating the same, a valve for opening and closing said receptacle outlet and manually operable valve actuating means extending from said valve to the top of the receptacle and to adjacent the axis of rotation thereof for actuating the valve to open the drain outlet of the receptacle.

In testimony whereof I affix my signature.

SARAH B. HARKER.